(12) United States Patent
Klein et al.

(10) Patent No.: US 6,861,398 B2
(45) Date of Patent: Mar. 1, 2005

(54) THIXOTROPIC DISPERSIONS OF POLYSUCCINIMIDE AND THEIR USE

(75) Inventors: Thomas Klein, Köln (DE); Joachim Voss, Leverkusen (DE); Holger Schmidt, Dormagen (DE); Fred Ebert, Leverkusen (DE); Harry-Günter Müller, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/152,437

(22) Filed: May 21, 2002

(65) Prior Publication Data

US 2003/0060391 A1 Mar. 27, 2003

(30) Foreign Application Priority Data

May 22, 2001 (DE) ......................... 101 24 903

(51) Int. Cl.[7] .............................. C11D 3/26; C11D 3/37; C08G 73/10; C04B 24/12
(52) U.S. Cl. ....................... 510/199; 510/238; 510/366; 510/417; 510/421; 510/475; 510/480; 510/499; 510/501; 106/713
(58) Field of Search ................................ 510/199, 238, 510/366, 417, 421, 475, 480, 499, 501; 106/713

(56) References Cited

U.S. PATENT DOCUMENTS

| | | | |
|---|---|---|---|
| 5,266,237 A | * 11/1993 | Freeman et al. ............ | 510/220 |
| 5,554,320 A | 9/1996 | Yianakopoulos ....... | 252/389.23 |
| 6,004,916 A | 12/1999 | Mills et al. ................. | 510/238 |
| 6,054,553 A | 4/2000 | Groth et al. ................ | 528/335 |
| 6,083,890 A | 7/2000 | Miskiel et al. ............. | 510/108 |
| 6,187,898 B1 | 2/2001 | Wagner et al. ............. | 528/328 |
| 6,419,016 B1 | * 7/2002 | Reddy ........................ | 166/293 |
| 6,524,392 B1 | * 2/2003 | Traenckner et al. .......... | 134/6 |
| 2002/0193279 A1 | * 12/2002 | Klein et al. ................. | 510/480 |
| 2003/0060391 A1 | * 3/2003 | Klein et al. ................. | 510/417 |

FOREIGN PATENT DOCUMENTS

| | | | |
|---|---|---|---|
| CA | 2195931 | 7/1997 | |
| DE | 199 08 564 | 9/1999 | |
| EP | 0 884 344 | 12/1998 | |
| EP | 1260539 | * 11/2002 | ........... C08G/73/10 |
| JP | 8-169741 | 7/1996 | |
| JP | 8169741 | * 7/1996 | ........... C04B/24/24 |

OTHER PUBLICATIONS

Mosig et al, "Kinetic and Thermal Characterization of the Hydrolysis of Polysuccinimide", Ind. Eng. Chem. Res. 36, pp. 2163–2170, 1997 (no month given).*

Ind. Eng. Chem. Res. 36, (month unavailable) 1997, pp. 2163–2170, Jörg Mosig, C.H. Gooding, and A.P. Wheeler, "Kinetic and Thermal Characterization of the Hydrolysis of Polysuccinimide".

Investigation by Bayer AG, brochure "PASP Na–Salz", Edition 3.99, Order No.:CH 201201, pp. 3–29 Polyasparaginsäure Natriumsalz (Polyaspartat Natriumsalz), not translated.

* cited by examiner

*Primary Examiner*—Brian P Mruk
(74) *Attorney, Agent, or Firm*—Diderico van Eyl; Godfried R. Akorli

(57) ABSTRACT

The present invention relates to stable thixotropic polysuccinimide (PSI) dispersions, known as slurries, and to their use as additives for improving the flow properties of concrete, in oil wells, in acidic gel cleaners, and in drainage systems of tunnel constructions.

8 Claims, 4 Drawing Sheets

THIXOTROPIC DISPERSIONS OF POLYSUCCINIMIDE AND THEIR USE

BACKGROUND

Figure 1:
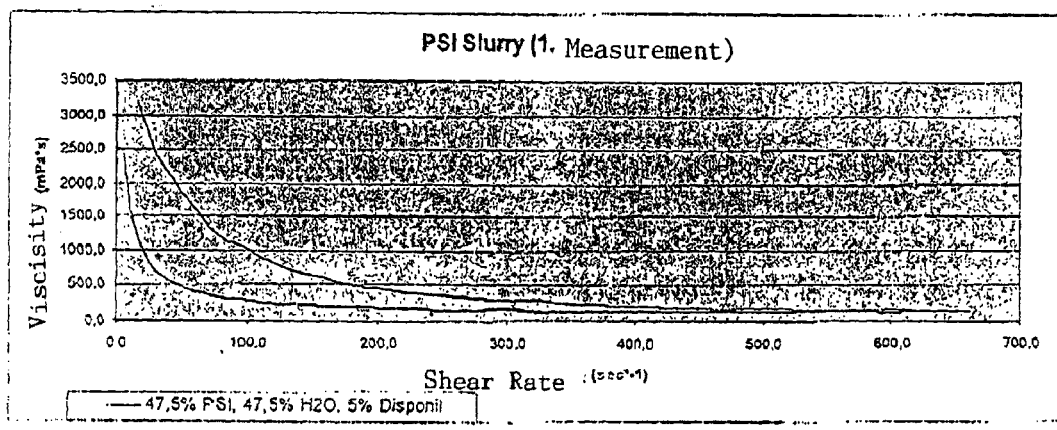

The present invention relates to stable thixotropic polysuccinimide (PSI) dispersions, known as slurries, and to their use as additives for improving the flow properties of concrete, in oil wells, in acidic gel cleaners, and in drainage systems of tunnel constructions. Stable in the sense of the present invention means stable against separation of liquid and solid compounds.

Polyaspartic acids and their salts have in recent years attracted increased interest as biodegradable alternatives to polyacrylic acids.

The preparation of polyaspartic acids by a variety of processes has been investigated in depth. For example, the condensation of aspartic acid or ammonium maleate and/or the dehydration products thereof leads to the intermediate polysuccinimide (PSI), which by hydrolysis under alkaline conditions forms salts of polyaspartic acid. If polysuccinimide is exposed to water under initially neutral conditions, then slowly polyaspartic acid is formed, and a pH of 2.5–3 is established. Under acidic conditions at room temperature, the hydrolysis comes to a standstill (Mosig, Gooding, Wheeler, Ind. Eng. Chem. Res. 1997, 36, 2163–2170).

In the course of the investigations on the hydrolysis of PSI as part of the present invention, the influence of particle size and hence also of the water/PSI phase boundary on the hydrolysis rate of PSI itself became clear. The investigations showed that the hydrolysis rate is directly proportional to the particle surface area. Reaction of polysuccinimide and water under increased pressure and elevated temperature produces a mixture of aspartic acid and its oligomers.

Because of their acidic properties, polyaspartic acids are highly effective in the breakup or reformation of deposits, such as those of calcium carbonate. The effect is founded firstly on the pH in the immediate vicinity of the opening succinimides in the PSI, secondly, following neutralization of the polyaspartic acid, on the dispersing action of the polyaspartate anion.

The use of polyaspartic acid in an acidic environment is hindered, however, by its instability under these conditions. Polyaspartic acid is subject to acidic hydrolysis to monomeric aspartic acid, especially under a thermal load (investigations by Bayer A G, brochure "PASP Na-Salz"— polyaspartic acid sodium salt; a new, biodegradable dispersant, Edition 3.99, Order No.: CH 201201). It was possible to show that a 1% strength polyaspartic acid undergoes 61% hydrolysis after 24 h at a pH of 4,77% hydrolysis at a pH of 2, which particularly in the case of oil wells is disadvantageous.

Cleaners very often contain viscosity-increasing substances. Examples of cleaners are given in U.S. Pat. No. 6,083,890 with xanthan as thickener, in U.S. Pat. No. 6,004,916 with ammonium EDTA as complexing agent and a solvent, and also nonionic surfactants as dispersion media, and in U.S. Pat. No. 5,554,320 with phosphoric acid and paraffinsulfonate, fatty alcohol-EP/PO copolymer as surfactant.

With the direct use of polyaspartic acid in oil wells, a problem which is found is that the polyaspartic acid becomes diluted as a result of diffusion following its introduction into the bore hole. As a result, the concentration may fall below optimum ranges.

JP-A 8 169 741 describes the use of powderous polysuccinimide for improving the flow behavior of mortar mixtures with Portland cement. Incorporation in powder form, however, is typical, since uniform distribution within the cement mortar is achieved only by prolonged mixing. Uniform distribution is absolutely necessary, since inhomogeneities lead to problems with the ultimate hardness of the cement. It would be advantageous to provide PSI as a paste or dispersion in water, in which the wetting of the polysuccinimide by water had already taken place and which would therefore prevent the lumping that occurs in the course of stirred incorporation.

The object was therefore to find thixotropic formulations of PSI with water which meet all of these requirements as regards stability and liquefiability.

Stable in the sense of the present invention has been already discussed above but also refers to the feature that the thixotropic dispersions of the invention maintain their useful form or useful chemical/physical nature for a reasonable storage period.

Surprisingly, thixotropic dispersions of PSI with water according to the present invention exhibit all of these properties.

SUMMARY

The invention relates to a stable thixotropic dispersion comprising polysuccinimide in a protic solvent.

The invention also relates to a process for preparing a thixotropic polysuccinimide dispersion comprising: (a) introducing polysuccinimide and/or its copolymers to a vessel, (b) adding a protic solvent and surfactant to the vessel and mixing, thereby forming a mixture, (c) thoroughly mixing the mixture, thereby forming a homogeneous dispersion, and (d) solidifying the homogeneous dispersion.

These and other features, aspects, and advantages of the present invention will become better understood with reference to the following description and appended claims.

DESCRIPTION

The present invention accordingly provides thixotropic dispersions of polysuccinimide and protic solvents, preferably with water, with particular preference deionized water, which further comprise a hydrocolloid, preferably a surfactant, with particular preference an anionic or nonionic surfactant.

PSI in the fine-particled state required for the thixotropic dispersions of the invention may be prepared in accordance with the processes of DE-A 19 706 901 or EP-A 0 786 487, incorporated herein by reference in their entirety.

The thixotropic PSI dispersions of the invention contain from about 10 to about 90% by weight of PSI, preferably from about 30 to about 70% by weight of PSI, with particular preference from about 40 to about 60% by weight of PSI.

The thixotropic PSI dispersions of the invention are prepared by intensively stirring a finely particulate polysuccinimide having a typical particle size in the maximum of a few hundred $\mu$m. Ideally, a PSI having a particle diameter of from about 10 to about 250 $\mu$m, preferably from about 10 to about 150 $\mu$m, with particular preference from about 10 to about 100 $\mu$m, and, with very particular preference, of from about 10 to about 70 $\mu$m in the maximum of the distribution is used. The large surface area is advantageous for the rapid establishment of equilibrium.

The thixotropic PSI dispersions of the invention contain from about 0.01 to about 20% by weight of surfactants, preferably from about 1 to about 10% by weight of surfactants, with particular preference from about 1 to about 5% by weight of surfactants.

The function of the surfactant is to disperse the PSI as finely as possible. In this context, both nonionic and anionic surfactants are suitable in principle; owing to the positive charge, cationic surfactants may lead to instances of flocculation of electroneutral aggregates with the polyaspartate anion.

Preferred surfactants in the context of the present invention are nonionic surfactants, with particular preference fatty alcohol ethoxylates, with very particular preference $C_{14-C16}$ fatty alcohols having a degree of ethoxylation of 20–40.

Besides surfactants the thixotropic PSI dispersions of the invention may comprise thickeners, with particular preference biodegradable thickeners.

In one preferred embodiment, biodegradable thickeners are added to the thixotropic PSI dispersions. In the context of the present invention, preferred thickeners used are cellulose ethers. In the context of the present invention, a particularly preferred thickener used is methylcellulose.

The PSI dispersions of the invention are obtainable by dispersing the PSI in a protic solvent, preferably water, especially deionized water. The dispersions of the invention are prepared by first introducing PSI and/or its copolymers, adding the water and homogenizing the water thoroughly using an Ultra-turrax—or a similar stirring apparatus suitable for the present purpose. Thereafter, the surfactant is added and thorough mixing with the Ultra-turrax is repeated. Finally, a homogeneous dispersion is obtained which soon solidifies after the stirring operation.

PSI represents an alternative to polyaspartic acid because it can be converted into a fine, stable dispersion which does not sediment and which, through an increase in viscosity, substantially suppresses diffusion and thus hydrolysis in water.

Furthermore, by means of the PSI dispersions of the invention it is possible to achieve a higher storage stability of polyaspartic acid. In application, an inventive PSI dispersion is able to be liquefied by means of shear forces, so making available polyaspartic acid in the manner of a sustained release effect. The amount of polyaspartic acid present in equilibrium with polysuccinimide under these conditions is available in order, for example, to break up calcium carbonate encrustations. The polyaspartic acid then removed from the system by neutralization can be reformed by hydrolysis, so that there is always sufficient (although low) concentrations of free polyaspartic acid available.

Fine stable PSI dispersions of the invention, known as thixotropic PSI dispersions, are also suitable for use as acidic gel cleaners, such as, for instance, in the sanitary segment for dissolving lime deposits. Ideally, a gel cleaner flows along the surface to be cleaned, but thickens when there are no shear forces and so remains adhering to the surface. The contact time, especially in the case of vertical surfaces, remains greatly increased, as does, consequently, the cleaning effect when thixotropic PSI dispersions according to the present invention are used.

In the use in oil wells it is advantageous to have the thixotropic PSI dispersion which solidifies after being pumped in oil wells and which releases polyaspartic acid only gradually.

In tunnel drainage systems it is possible under certain circumstances for instances of sintering to occur, leading to blockage of the piping system. Often, these sites are inaccessible. There again, it is advantageous to have the thixotropic PSI dispersion according to the present invention which solidifies at the blockage points after being pumped into the piping system and which releases active substance (polyaspartic acid) at the site over a prolonged period, and which leads to concentration gradients with local maxima.

The thixotropic PSI dispersions of the invention exhibit the desired viscosity behavior, the stability needed for the above-mentioned applications, and also liquefiability. Generally the dispersions are stable at least 300 days at a temperature that is less than about 20° C., or from at least 200 days at a temperature that is less than about 25° C., or from at least 150 days to about 200 days at a temperature ranging from about 25° C. to about 30° C.

They are therefore suitable for use in cement or concrete for improving its flow properties, in drainage systems of tunnel constructions, in oil wells, and in acidic gel cleaners.

In acidic gel cleaners, the thixotropic PSI dispersions of the present invention permit the cleaning of sanitary installations or of scratch-sensitive surfaces such as, for example, plastics, bronze, brass, silver, lead crystal or glass ceramic hobs.

The present invention therefore also relates to cements or concretes and also gel cleaners which comprise a flow-property-improving fraction of thixotropic PSI dispersions.

The invention is further described in the following illustrative examples in which all parts and percentages are by weight unless otherwise indicated.

EXAMPLES

Example 1

Approximately 50:50% by weight PSI/water slurries were admixed with 3–5% by weight fatty alcohol ethoxylates and intensively stirred with the Turrax stirrer. After leaving them to stand for 24 hours, their viscosity as a function of the shear rate was measured using a rotational viscometer. A curve typical of that for thixotropic liquids was found.

Figure 2:
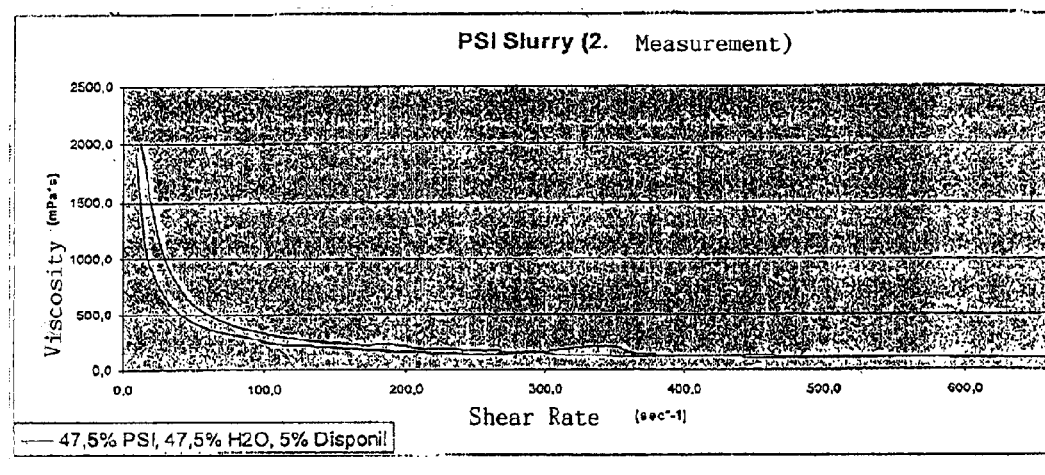
Figure 3:
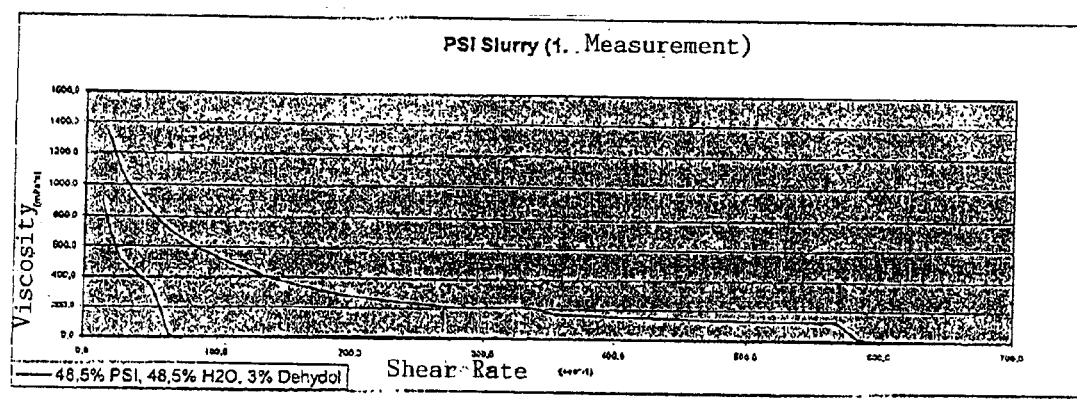
Figure 4:
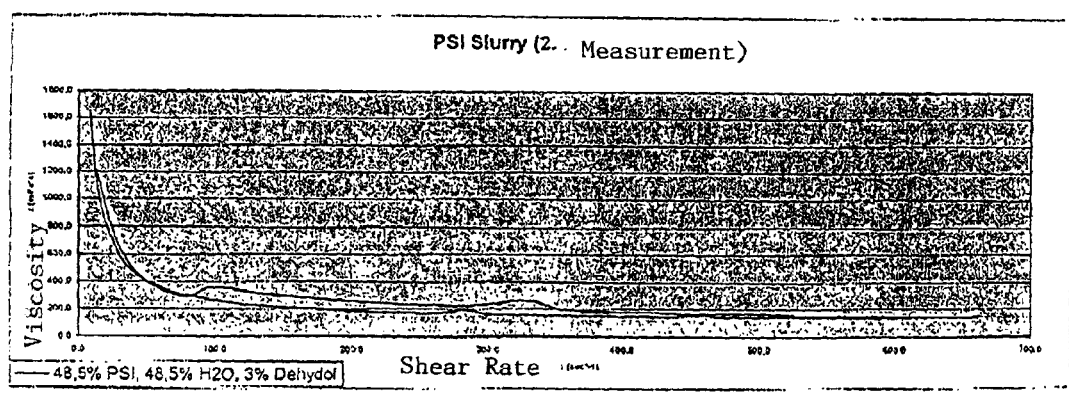

FIGS. 1 and 2 show by way of example two measurements of a PSI slurry of 47.5% by weight PSI, 47.5% by weight water and 5% by weight Disponil®. Disponil® is a surfactant from Henkel AG FIGS. 3 and 4 show by way of example two measurements of a PSI slurry of 48.5% by weight PSI, 48.5% by weight water and 3% by weight Dehydol®. Dehydol® is a surfactant of Henkel AG.

Example 2

Water-based PSI slurries may be prepared using a thickener even with relatively small amounts of active substance, as the following example shows.

10 g of polysuccinimide were dispersed in 250 ml of water. The dispersion sediments over the course of 15 minutes. A corresponding mixture was admixed with 15 g of methylcellulose and stirred intensively for 30 minutes. The gelatinous dispersion formed remains stable for 14 days.

Example 3

A formulation according to Example 1 was capable of dissolving calcium carbonate, as the following example shows:

In a reaction vessel, 200 ml of the slurry from Example 1 were admixed under nitrogen atmosphere with 10 g of finely powdered limestone, and the mixture was stirred intensively.

A stream of nitrogen was passed through the vessel, and was subsequently passed through a barium hydroxide solution (Barytes water). Over the course of 5 minutes, a marked clouding of the barium hydroxide solution was observed as a result of the carbon dioxide liberated from the limestone. The control test without polysuccinimide shows no clouding of the barium hydroxide solution.

Example 4

Two limestone blocks originating from a tunnel were placed either in 200 ml of a slurry of 60% by weight $H_2O$ and 40% by weight PSI and 2% by weight surfactant or in 200 ml of mains water and were stirred with a magnetic rod arranged to the side of them. In no case was any evolution of gas observed.

After one week at room temperature the blocks were removed, freed from adhering slurry with distilled $H_2O$, and dried to constant weight:

| Block in PSI slurry (PSI content: 60%) | Block in mains water (17° dH*) |
|---|---|
| Initial weight: 42.4945 g | Initial weight: 40.363 g |
| Final weight: 37.5483 g | Final weight: 40.359 g |
| Difference: 4.9462 g = 11.6% | Difference: 0.004 g = 0% |

*dH = German hardness

The test clearly shows the breakup of a limestone block by 11.6% after just one week, initiated by the use of a slurry of the invention.

Example 5

In a shaft of a tunnel drainage system with greatly reduced water flow (water: pH 8 23° dH), the following PASP concentrations were obtained following the application of 500 g of polysuccinimide or 1000 g of PSI dispersion: as tabs (2.5 cm diameter, compressed about 3 ppm with 10% stearic acid) as dispersion (48.5% PSI>30 ppm 3% Dehydol®) measured 1 week following application of the PSI application form.

Although the present invention has been described in detail with reference to certain preferred versions thereof, other variations are possible. Therefore, the spirit and scope of the appended claims should not be limited to the description of the versions contained therein.

What is claimed is:

1. A composition comprising a stable thixotropic dispersion containing polysuccinimide in a protic solvent, a hydrocoiloid. and an anionic or non:onic surfactant.

2. The dispersion according to claim 1, wherein the protic solvent is water.

3. The dispersion according to claim 1, wherein the surfactant is a fatty alcohol ethoxylate.

4. The dispersion according to claim 1, wherein the dispersion contains from about 10 to about 90% by weight of polysuccinimide and from about 0.01 to about 20% by weight of a surfactant.

5. The dispersion according to claim 1, wherein the dispersion further comprises biodegradable thickeners.

6. A process for preparing a thixotropic polysuccinimide dispersion comprising:

(a) Introducing polysuccinimide and/or its copolymers to a vessel, (b) adding a protic solvent and surfactant to the vessel and mixing, thereby forming a mixture, (c) thoroughly mixing the mixture, thereby forming a homogeneous dispersion, and (d) solidifying the homogeneous dispersion.

7. A cement composition or a concrete composition comprising a flow-property-improving fraction of a thixotropic polysuccinimide dispersion, wherein the disoersion compises a stable thixotropic dispersion containing polysuccinimide in a protic solvent, a hydrocoiloid. and an anionic or nonionic surfactant.

8. An acidic gel cleaner composition comprising a flow-property-improving fraction of a thixotropic polysuccinimide dispersion, wherein the dispersion comprises a stabie thixotropic dispersion containing polysuccinimide in a protic solvent, a hydrocoiloid, and an anionic or nonionic surfactant.

* * * * *